United States Patent

Inoue

[15] 3,657,578
[45] Apr. 18, 1972

[54] PIEZOELECTRIC TRANSDUCER ELEMENTS

[72] Inventor: Keiji Inoue, Yokohama, Japan
[73] Assignee: Denki Onkyo Company, Limited, Tokyo, Japan
[22] Filed: Sept. 17, 1970
[21] Appl. No.: 73,132

[30] Foreign Application Priority Data

Sept. 24, 1969 Japan................................44/90962
Sept. 24, 1969 Japan................................44/90963
Sept. 24, 1969 Japan................................44/90964

[52] U.S. Cl..........................310/8, 310/9.5, 310/9.8
[51] Int. Cl. ..................................................H01v 7/00
[58] Field of Search..............333/72; 310/8, 8.9, 9.1–9.4, 310/9.7, 9.8

[56] References Cited

UNITED STATES PATENTS

| | | | |
|---|---|---|---|
| 3,281,726 | 10/1966 | Schafft | 310/9.8 X |
| 3,562,798 | 2/1971 | Berlincourt et al. | 310/8.1 X |
| 2,975,354 | 3/1961 | Rosen | 333/72 |
| 3,518,573 | 6/1970 | Smith | 310/9.8 |
| 3,564,463 | 2/1971 | Beaver et al. | 310/9.4 X |
| 3,562,563 | 2/1971 | Schafft | 310/9.8 X |

*Primary Examiner*—J. D. Miller
*Assistant Examiner*—Mark O. Budd
*Attorney*—Chittick, Pfund, Birch, Samuels & Gauthier

[57] ABSTRACT

In a piezoelectric transducer element comprising an elongated ceramic plate of a piezoelectric material, a pair of driving electrodes applied on the opposite surfaces of one end of the plate and an output electrode applied to the end surface of the opposite end, an insulator member in the form of a thin coating or flange is applied to surround the plate at a point near the driving electrodes or the output electrode preferably at a node of the mechanical vibration of the element.

5 Claims, 6 Drawing Figures

PATENTED APR 18 1972  3,657,578

INVENTOR.
KEIJI INOUE
BY Chittick, Pfund,
Birch, Samuels & Gauthier

3,657,578

PIEZOELECTRIC TRANSDUCER ELEMENTS

BACKGROUND OF THE INVENTION

This invention relates to a piezoelectric transducer or voltage converting element provided on its surface means to prevent electric discharge.

The piezoelectric transducer element generally comprises a plate shaped fired ceramic of a piezoelectric material, a pair of driving electrodes of electroconductive material, silver for example, applied on the opposite sides of one half of the length of the ceramic element and an output electrode applied on the opposite end surface. The pair of driving electrodes and portion of the ceramic element interposed between them cooperate to constitute the driving portion of the element while the remaining half and the output electrode cooperate to constitute the generating portion. When an AC input signal having a frequency commensurate to the natural frequency of the element is applied across the driving electrodes the ceramic plate undergoes mechanical vibrations whereby a potential distribution which is the maximum at the output electrode is created along the length of the generating portion. This potential is derived through the output electrode as the output voltage. However, in the transducer element of the construction described above since the potential gradient is steep at the build-up or at the beginning end of the generating portion a local surface or creepage discharge tends to occur at portions of the surface of the element when the surface is contaminated by the deposition of dirt or where the surrounding humidity is high. Such a local creepage discharge is not desirable because it varies the output voltage.

Further, with the construction described above, load change in the output circuit often causes temporary abnormal rise of the potential at the generating portion. This potential rise per se, or in combination with the above described phenomenon results in the creepage discharge along the length of the generating portion and this creepage discharge disturbs the potential distribution of the generating portion thus varying the output voltage.

SUMMARY OF THE INVENTION

An object of this invention is to provide a novel piezoelectric transducer element having means to prevent the creepage discharge without disturbing free mechanical vibrations of the generating portion. In other words, the invention contemplates the stabilization of the output voltage of the piezoelectric element by preventing the creepage discharge.

According to this invention these and other object can be accomplished by providing a ring shaped insulator about a portion of the generating portion of the ceramic element along the length thereof. The insulator may take the form of at least one strip of an insulator coating having a certain width and covering the portion of the ceramic at portions of large potential gradient or portions near the driving portion. Alternatively, such an insulator coating may be positioned near the output electrode. The coating may be made of waxes, insulating varnishes, silicone resins, epoxide resins and any other well known insulating material and is made extremely thin. Further, according to this invention, the ring shaped insulator may be positioned at the node of the mechanical vibrations of the ceramic element. In addition, the insulator may take the form of a vertical wall or a flange of rubber or resin secured to the surface of the element.

BRIEF DESCRIPTION OF THE DRAWINGS

Further objects and advantages of the invention will become apparent from the following description taken in conjunction with the accompanying drawings in which.

DESCRIPTION OF THE PREFERRED EMBODIMENTS

Figure 1:
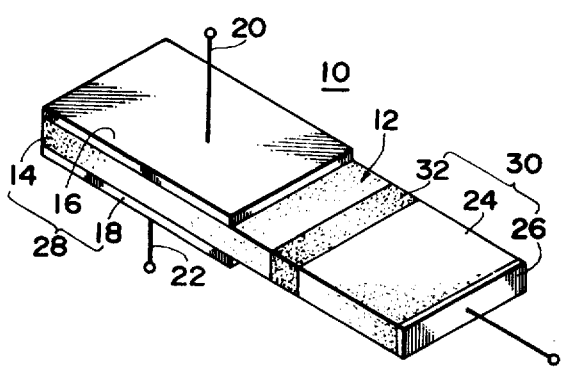
FIG. 1 shows a perspective view of a piezoelectric transducer element embodying this invention.

Referring now to the accompanying drawing a preferred embodiment of the piezoelectric transducer element generally designated by numeral 10 comprises an elongated rectangular ceramic plate of fired piezoelectric material 12. Opposite surfaces of the lefthand half 14 of the element are coated by a pair of driving electrodes 16 and 18 of an electroconductive material, silver for instance. The electrodes may be firmly applied by any well known technique such as vacuum deposition. As diagrammatically shown, input terminals or lead wires 20 and 22 are electrically and mechanically connected to respective driving electrodes by brazing, for example.

On the end surface of the righthand half 24 of the element is secured an output electrode 26 by the same method as driving electrodes 16 and 18.

Figure 2:
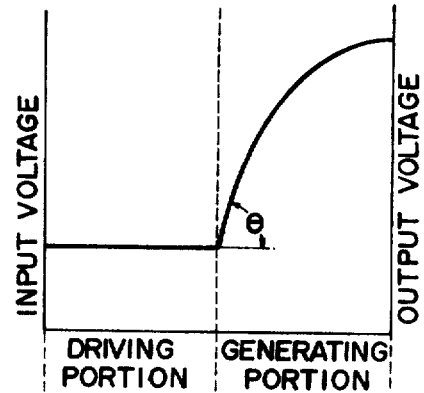
FIG. 2 is a plot to show the potential distribution along the length of the element.

Thus, the lefthand half 14 of the element 12 and the driving electrodes 16 and 18 applied thereto cooperate to constitute the driving portion 28 whereas the righthand half 24 and output electrode 26 cooperate to constitute the generating portion of the element 30. When an AC input signal is impressed across input terminals 20 and 22 a potential distribution is created along the length of the element 10 as shown in FIG. 2. More particularly, the voltage gradient (expressed by an angle $\theta$) of the sinusoidal potential distribution along the generating portion 30 is extremely steep at the build-up portion or at the portion immediately adjacent the driving portion 28.

According to this invention, an insulator coating 32 of a limited width is applied around the element at portions of the righthand half relatively close to the driving portion 28. In order not to interfer with free mechanical vibratory motions of the ceramic element 12 it is advantageous to make the insulator coating extremely thin. The coating may be made of waxes, insulating varnishes, silicone resins, epoxide resins or any other suitable insulating material and can be applied on the surface of the element by means of a brush or a spray. In this manner, as the portions of the element where the potential gradient is steep thus causing local creepage discharge are coated by the insulator coating 32, it is possible to positively prevent such creepage discharge. In addition to a single strip of the insulator coating, a plurality of closely spaced apart strips of the insulator coatings may be used, if desired.

Figure 3:
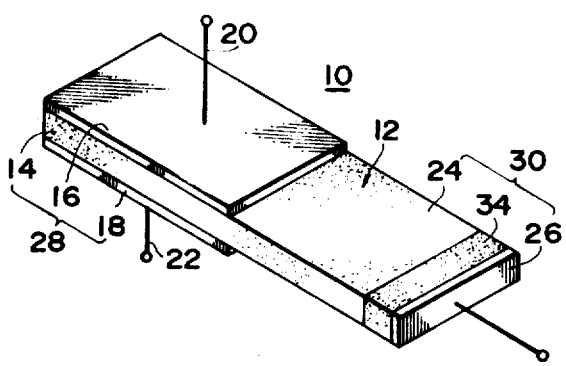
FIG. 3 is a perspective view of a modified element.

In the modified embodiment shown in FIG. 3 the insulator coating 34 is positioned close to the output electrode 26. This arrangement prevents creepage discharge starting from the output electrode 26 toward the driving electrodes 16 and 18. Even if the potential of the output electrode 26 temporarily rises to an abnormal value due to variations in the load connected to the output electrode, the provision of the insulator coating 34 can positively prevent occurence of the creepage discharge, thus assuring stable operation of the element.

Figure 6:
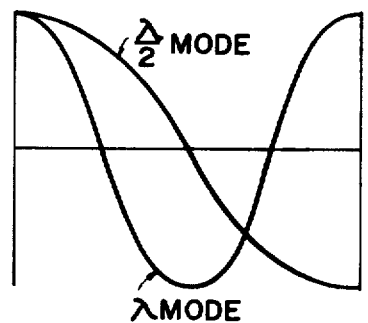
FIG. 6 is a graph showing the comparison between two mechanical vibrational motions of the ceramic element.

As is well known in the art, upon application of an AC input signal across driving electrodes 16 and 18, as shown in FIG. 6 longitudinal vibrations are set up having frequencies $n/2\lambda$ mode (where $n$ equals an integer). Accordingly, in the case of the $\lambda$ mode vibratory movement, one inmovable point or node is formed at each of the driving portion 28 and generating portion 30 of the piezoelectric transducer element 12. One of these nodal points is situated at the longitudinal center of the righthand half.

Figure 4:
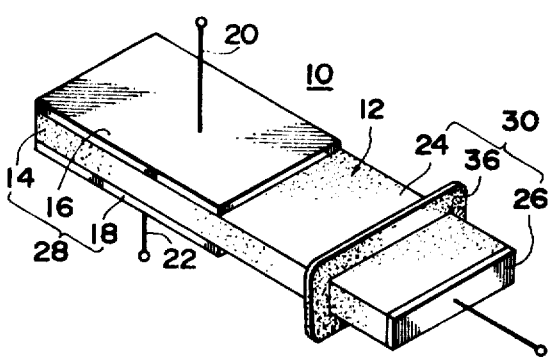
FIG. 4 shows a perspective view of still further modification.
Figure 5:
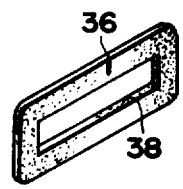
FIG. 5 shows a perspective view of an insulator flange utilized in the embodiment shown in FIG. 4

In the modified embodiment shown in FIG. 4, a rectangular flange shaped vertical insulator 36 having a rectangular window 38 as shown in FIG. 5 is placed at this node. The height of the flange is sufficient to electrically isolate surfaces of the element on the opposite sides of the flange. Usually the flange 36 is made of a plastic or hard rubber, and cemented or directly molded about the ceramic element 12. As above described since the insulator flange 36 is provided at the node or a point where the amplitude of the mechanical vibration of the element is substantially zero, the flange does not interfere with the normal mechanical vibration of the element and yet electrically isolates output electrode 26 from driving electrodes 16 and 18. It is thus possible to prevent the creepage discharge and to assure stable operation of the element.

It can be understood that the invention is not limited to the illustrated embodiments and that many changes and modifications may be made without departing from the true spirit and scope of the invention as defined in the appended claims.

What is claimed is:

1. In a piezoelectric transducer element comprising an elongated ceramic plate of a piezoelectric material a pair of driving electrodes applied on the opposite surfaces of one end of said plate and an output electrode applied to the end surface of the opposite end, the improvement which comprises an insulator ring member means applied on the surface of said plate to surround said plate at a point between said input electrodes and said output electrode and provide a dielectric surface discontinuity for the potential distribution along the surface of said plate.

2. The improvement according to claim 1 wherein said insulator member comprises at least one insulator coating of limited width and is located near said driving electrodes.

3. The improvement according to claim 2 wherein said insulator member is located near said output electrode.

4. The improvement according to claim 1 wherein said insulator member is located at a node of the mechanical vibrations of said element between said driving electrodes and said output electrode.

5. The improvement according to claim 1 wherein said insulator member comprises a thin flange of insulator material having sufficient height to electrically isolate said driving electrodes and said output electrode from each other.

* * * * *